United States Patent
Yang et al.

(10) Patent No.: US 10,140,874 B2
(45) Date of Patent: Nov. 27, 2018

(54) SYSTEM AND METHOD FOR ENABLING VIRTUAL SIGHTSEEING USING UNMANNED AERIAL VEHICLES

(71) Applicant: SZ DJI TECHNOLOGY CO., LTD., Shenzhen, Guangdong (CN)

(72) Inventors: Kang Yang, Guangdong (CN); Ang Liu, Guangdong (CN); Guyue Zhou, Guangdong (CN); Mingming Gao, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/795,652

(22) Filed: Jul. 9, 2015

(65) Prior Publication Data
US 2016/0035224 A1    Feb. 4, 2016

Related U.S. Application Data

(63) Continuation of application No. PCT/CN2014/083484, filed on Jul. 31, 2014.

(51) Int. Cl.
*G08G 5/00* (2006.01)
*H04B 7/185* (2006.01)
(Continued)

(52) U.S. Cl.
CPC ......... *G08G 5/0043* (2013.01); *B64C 39/024* (2013.01); *G06Q 10/04* (2013.01);
(Continued)

(58) Field of Classification Search
CPC ............................. G08G 5/0043; B64C 39/024
See application file for complete search history.

(56) References Cited

U.S. PATENT DOCUMENTS 2,949,179 A * 8/1960 Busse .................. B65G 47/088
  198/418.1
4,128,126 A * 12/1978 Forster .................. F28D 9/0025
  165/165
(Continued)

FOREIGN PATENT DOCUMENTS

CN    102339021 A    2/2012
CN    102637023 A    8/2012
(Continued)

OTHER PUBLICATIONS

WO, Written Opinion, Appln. No. PCT/CN2014/083484, dated Apr. 21, 2015.
(Continued)

*Primary Examiner* — Jelani A Smith
*Assistant Examiner* — Donald J Wallace
(74) *Attorney, Agent, or Firm* — Anova Law Group, PLLC

(57) ABSTRACT

A system of virtual sightseeing using unmanned aerial vehicles (UAV) and methods of making and using same. The virtual sightseeing system can include a plurality of UAVs arranged over a geographical area of interest in one or more ground configurations. In response to a sightseeing request, one or more UAVs are activated and deployed to a sightseeing region of interest. The UAVs travel to the region of interest and, upon arriving, acquire data for presentation in real-time. The data can include both visual and non-visual data from the region of interest and can be presented in integrated fashion in a virtual reality terminal. The virtual sightseeing is supervised by an operational subsystem that is responsible for efficient allocation of UAVs in response to multiple sightseeing requests. Even if physically separate, the subsystems of the virtual sightseeing system can com-
(Continued)

municate via a data communication subsystem, such as a wireless network.

28 Claims, 11 Drawing Sheets

(51) Int. Cl.
*B64C 39/02* (2006.01)
*G06Q 10/04* (2012.01)

(52) U.S. Cl.
CPC ......... *G08G 5/0069* (2013.01); *G08G 5/0078* (2013.01); *H04B 7/18506* (2013.01); *B64C 2201/127* (2013.01)

(56) References Cited

U.S. PATENT DOCUMENTS

| | | | | |
|---|---|---|---|---|
| 4,244,315 | A * | 1/1981 | Klein | B21D 51/383 413/17 |
| 6,449,103 | B1 * | 9/2002 | Charles | G02B 13/06 359/366 |
| 6,459,696 | B1 * | 10/2002 | Carpenter | H04J 3/0626 370/350 |
| 6,985,810 | B2 * | 1/2006 | Moitra | G06Q 10/047 701/1 |
| 7,788,703 | B2 | 8/2010 | Jou et al. | |
| 7,844,364 | B2 * | 11/2010 | McLurkin | G06N 3/008 294/86.4 |
| 8,060,270 | B2 * | 11/2011 | Vian | G05D 1/104 348/144 |
| 8,234,068 | B1 * | 7/2012 | Young | G01C 21/00 244/175 |
| 8,260,485 | B1 * | 9/2012 | Meuth | G06Q 10/063 340/995.21 |
| 8,439,301 | B1 * | 5/2013 | Lussier | B64F 1/02 244/63 |
| 9,760,087 | B2 * | 9/2017 | Hoareau | G05D 1/0027 |
| 2004/0030571 | A1 * | 2/2004 | Solomon | G05D 1/0088 700/248 |
| 2006/0114324 | A1 * | 6/2006 | Farmer | G01S 7/003 348/144 |
| 2007/0284474 | A1 * | 12/2007 | Olson | G05D 1/0022 244/10 |
| 2008/0135687 | A1 * | 6/2008 | Penzo | B64G 1/641 244/173.1 |
| 2009/0156231 | A1 * | 6/2009 | Versteeg | G01S 5/0252 455/456.1 |
| 2009/0219224 | A1 * | 9/2009 | Elg | G06F 3/012 345/8 |
| 2009/0219393 | A1 * | 9/2009 | Vian | G07C 5/008 348/144 |
| 2010/0042269 | A1 | 2/2010 | Kokkeby | |
| 2010/0250022 | A1 * | 9/2010 | Hines | G05D 1/0094 701/2 |
| 2011/0128348 | A1 | 6/2011 | Theobald | |
| 2012/0069131 | A1 | 3/2012 | Abelow | |
| 2012/0248259 | A1 * | 10/2012 | Page | B64C 29/02 244/7 A |
| 2013/0307842 | A1 | 11/2013 | Grinberg et al. | |
| 2014/0032034 | A1 * | 1/2014 | Raptopoulos | G08G 5/0069 701/25 |
| 2014/0081479 | A1 | 3/2014 | Vian | |
| 2014/0140575 | A1 * | 5/2014 | Wolf | G06K 9/3233 382/103 |
| 2014/0303814 | A1 * | 10/2014 | Burema | A01B 79/005 701/3 |
| 2014/0316616 | A1 * | 10/2014 | Kugelmass | G05D 1/101 701/8 |
| 2015/0066248 | A1 * | 3/2015 | Arbeit | G01C 21/20 701/2 |
| 2015/0120094 | A1 * | 4/2015 | Kimchi | B64C 39/024 701/3 |
| 2015/0142211 | A1 * | 5/2015 | Shehata | H04N 7/181 701/2 |
| 2015/0280811 | A1 * | 10/2015 | Singhal | H04W 40/20 455/431 |
| 2016/0328979 | A1 * | 11/2016 | Postrel | B64C 39/024 |

FOREIGN PATENT DOCUMENTS

| | | |
|---|---|---|
| CN | 103170141 A | 6/2013 |
| CN | 203169989 U | 9/2013 |
| CN | 103576698 A | 2/2014 |
| CN | 103646424 A | 3/2014 |
| CN | 103823451 A | 5/2014 |
| JP | 2006101497 A | 4/2006 |
| JP | 2010006089 A | 1/2010 |
| JP | 2011039924 A | 2/2011 |
| JP | 2013038622 A | 2/2013 |
| JP | 2013066017 A | 4/2013 |
| JP | 2013232238 A | 11/2013 |
| WO | 2010097921 A1 | 9/2010 |
| WO | WO 2013/163746 A1 | 11/2013 |

OTHER PUBLICATIONS

WO, International Search Report, Appln. No. PCT/CN2014/083484, dated Apr. 9, 2015.

Mirk et al., "Using Drones for Virtual Tourism", INTENTAIN 2014, LNICST 136, 2014, pp. 144-147.

Baxter et al., "Scheduling UAV Surveillance Tasks, Lessons Learnt from Trials with Users", 2013 IEEE International Conference on Systems, Man and Cybernetics, Dec. 2013, p. 2606.

* cited by examiner

Terminal Subsystem 400

Tour Initiation 410

- Tour Initation Options 411
- Map 412
- UAV Availability 413
- Tour Entry 414
- Wait Time 415

Flight Control 420

- UAV Navigation 421
- Camera Controls 422
- Sensor Controls 423

Output 430

- Video 431
- Sound 432
- Actuators 433
- Other 434

Support 440

- Session Charges 441
- Feedback 442
- User Interaction 443
- Technical Help 444

FIG. 5 ary diagram illustrating an
SYSTEM AND METHOD FOR ENABLING VIRTUAL SIGHTSEEING USING UNMANNED AERIAL VEHICLES

CROSS-REFERENCE TO RELATED APPLICATIONS

This application is a continuation of, and claims priority to, copending PCT Patent Application Number PCT/CN2014/083484, which was filed on Jul. 31, 2014. The disclosure of the PCT application is herein incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to sightseeing and more particularly, but not exclusively, to systems and methods for enabling virtual sightseeing using unmanned aerial vehicles (UAVs).

BACKGROUND

Tourism, or sightseeing, is a vast industry with worldwide demand for various types of tourism exceeding 100 million persons each year. Traditional means of tourism have inherent limitations, such as time and lack of resources, imposed by the need for the tourist to be physically located at the destination of interest. Virtual tourism supplements and augments traditional tourism by evoking the experience of exploring another physical destination without the need for an individual to physically travel to that destination. Moreover, virtual tourism is not limited to recreation tours of urban, historical, cultural and other attractions, but can also encompass many other applications where the individual has a desire to explore a different physical space without actually being there.

There are numerous technical challenges associated with implementing an open-ended virtual sightseeing system that allows an end-user to explore at will. A major challenge is implementing the ability to sense all of the features of a physical space so as to enable the full virtual recreation of that environment. It is difficult to acquire the full range of sightseeing data without being limited by prior constraints. Moreover, current technologies such as fixed web-enabled cameras and satellite imaging are insufficient for such open-ended data acquisition for virtual sightseeing purposes. For example, it is difficult for cameras positioned at fixed locations at the time of installation to accommodate the wide variety of vantage points that are of potential interest during virtual sightseeing. Furthermore, systems of positioned cameras are ill-suited for covering large spaces as might be required for outdoor sightseeing applications. And while global imaging satellites can cover large areas, they are not well-suited for virtual sightseeing because of limited surface resolution.

Accordingly, there is a need for virtual sightseeing systems and methods that allow open-ended exploration of a region of interest without being limited by prior constraints on data acquisition.

BRIEF DESCRIPTION OF THE DRAWINGS

FIG. 5 is an exemplary diagram illustrating exemplary functions of a terminal subsystem for the virtual sightseeing system of FIG. 1.

Figure 1:
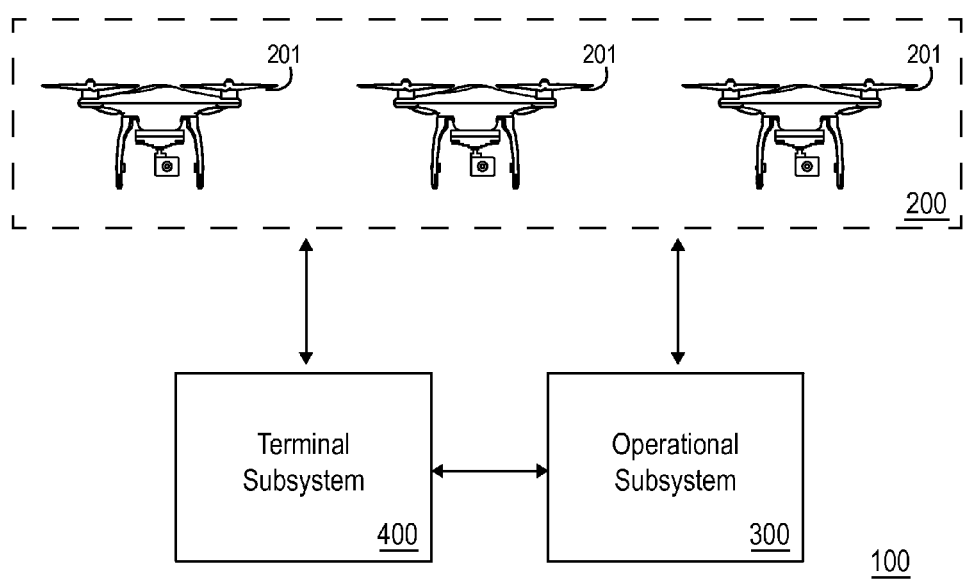
FIG. 1 is an exemplary top-level diagram illustrating an embodiment of a virtual sightseeing system using UAVs

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since current technologies are inadequate for providing open-ended virtual tourism, a need exists for virtual tourism systems and methods that overcome the deficiencies in the state of the art.

As used herein, the terms "tourism" and "sightseeing" are used interchangeably; these terms include, but are not limited to, tourism and sightseeing for recreational and non-recreational purposes.

Turning now to FIG. 1, an exemplary virtual sightseeing system 100 is shown as including a plurality of unmanned aerial vehicles (UAVs) 201, an operational subsystem 300, and a terminal subsystem 400. The UAVs 201 are also herein referred to as being parts of an unmanned aerial data acquisition subsystem 200. In some embodiments, the unmanned aerial data acquisition subsystem 200 includes only the UAVs 201 themselves. In other embodiments, the unmanned aerial data acquisition subsystem 200 includes UAVs 201 and certain support systems, as further described below in reference to FIG. 3.

Various types of UAVs 201 are suitable for use with the disclosed virtual sightseeing systems and methods. One popular UAV type, for example, is an aerial rotorcraft that is propelled by multiple rotors. One popular rotorcraft has four rotors and is known as a quadcopter, quadrotor helicopter, or quad rotor. Such a design provides the UAV with a high range of motion, allowing, e.g., vertical takeoff and landing as well as the ability to hover in mid-air for still aerial image acquisition. Exemplary quadcopters suitable for the virtual sightseeing systems and methods include numerous models currently available commercially. Various other UAV types are suitable for the virtual sightseeing systems and methods, including other rotor designs, e.g., single rotor (e.g. helicopter), dual rotor, trirotor, hexarotor, and octorotor designs. Fixed wing and hybrid rotorcraft-fixed wing UAVs can also be used. Furthermore, certain UAVs can be specially designed for the virtual sightseeing applications discussed herein, e.g., UAVs equipped with multiple instruments for acquiring both visual and non-visual data.

The UAVs 201 of the virtual sightseeing systems and methods can have features that allow them to be remotely controlled and/or autonomously piloted. In many virtual sightseeing applications, it is advantageous that UAVs 201 be capable of both remote and autonomous control so that the UAVs 201 can be switched between remote and autonomous control as needed. During the virtual sightseeing process, it can be advantageous for the user have some degree of control of the UAV 201. The UAV 201 thereby can be directed to regions of interest to the user and acquire the desired data regarding the region of interest. However, should the UAV 201 lose communication with the controller, autonomous piloting can take over control of the UAV 201, directing the UAV 201 to follow a pre-set course or to return to its home location. For example, some current quadcopter models have automatic homing features that use GPS systems to allow the quadcopter to return to its ground location as the need arises. Similarly, under certain routine deployment circumstances, e.g. deployment to a given region of interest prior to the time that a user takes control and/or during redeployment to a different ground station, it may be advantageous that the UAV 201 have some degree of autonomous control.

In some embodiments, it may be advantageous for the UAVs 201 of the virtual sightseeing system 100 and methods 800 (shown in FIG. 8), 900 (shown in FIG. 9) to include safety features, including the ability to avoid collision with other aircraft, people, and other objects that may not be taken into account in a predetermined flight path. Therefore, UAVs 201 can include systems that allow real-time monitoring of the surroundings of the UAVs 201 and provide the UAVs 201 with an ability to respond accordingly. Furthermore, the UAVs 201 additionally and/or alternatively can be equipped with mechanisms, e.g., lights, alarms, or electronic signals, for alerting other aircraft or people of its presence. The UAVs 201 can be equipped with airbags, parachutes, and the like, which minimize damage to the UAVs 201 in the event a crash or collision.

The UAVs 201 of the virtual sightseeing system 100 and methods 800 (shown in FIG. 8), 900 (shown in FIG. 9) can be equipped with various control systems and sensors (not shown) for controlling flight operations. The control systems can, for example, control flight characteristics such as attitude (pitch, roll, and yaw), velocity, etc. of the UAVs 201. Sensors relating to flight operations include inertial sensors such IMUs (inertial measurement units) that typically rely on a combination of accelerometers, gyroscopes, and sometimes magnetometers to report on a selected UAV's velocity, orientation, and gravitational forces. The UAV 201 can rely on other sensors, e.g., pressure sensors, temperature, wind speed, and altitude sensors, to assist in its flight operations. Through various computational operations, e.g. integral operations, the UAV's position can be extrapolated from such sensor data. Alternatively, the UAVs 201 can sense their own position, for example, through a global positioning system (GPS). In some embodiments, the UAVs 201 are equipped with both inertial sensors and GPS systems, which can be used in complement with one another.

The UAVs 201 of the virtual sightseeing system 100 and methods 800 (shown in FIG. 8), 900 (shown in FIG. 9) can be equipped with appropriate instruments for capturing data regarding a region of interest for virtual sightseeing. It is generally advantageous that the instruments be lightweight and able to provide high-frequency data feeds to other components of virtual sightseeing system 100 to facilitate real-time collection of visual and non-visual data and/or presentation of the collected data in real time. The UAVs 201 can be equipped with various instruments for collecting visual data, such as a variety of conventional cameras for image and video acquisition. Additionally and/or alternatively, the UAVs 201 can be equipped with various instruments for collecting non-visual data relating to sound, temperature, pressure, humidity, precipitation, wind speed and direction, and/or other environmental factors that are not easily captured visually. Other examples of non-visual data that can be collected by the UAVs 201 include chemical concentrations and non-visible electromagnetic signals, as may be useful in environmental sampling, industrial emission monitoring, hazard materials (HAZMAT) operations, and so forth. Exemplary instruments for visual and non-visual data collection include, but are not limited to, electro-optical sensors, thermal/infrared sensors, color or monochrome sensors, multi-spectral imaging sensors, spectrophotometers, spectrometers, thermometers, illuminometers, microphones/sonic transducers, pressure sensors, altitude sensors, flow sensors, humidity sensors, precipitation sensors, wind speed sensors, wind direction sensors, anemometers, optical rain sensors, and/or other suitable devices for visual and non-visual data collection.

UAVs 201 of the virtual sightseeing system 100 and methods 800 (shown in FIG. 8), 900 (shown in FIG. 9) can be uniformly equipped or differently equipped. A selected UAV 201 equipped in a particular manner can be selected for deployment based upon a criterion of the sightseeing request, a characteristic of the region of interest, or other sightseeing variables. For example, the selected UAV 201 can be equipped with floodlights and/or night vision and used for night sightseeing or cave-exploration. In another example, the selected UAV 201 can be equipped with specialized cold-weather proofing and used for exploration of cold regions. In some cases, each geographical sightseeing area can be assigned a group of UAVs 201 that are specially equipped for the characteristics that area. Alternatively, it may be advantageous to equip each UAV 201 uniformly, or have some overlap of functionality capacity, so that the UAVs 201 are interchangeable in case one of the UAVs 201 experiences a malfunction.

Figure 2:
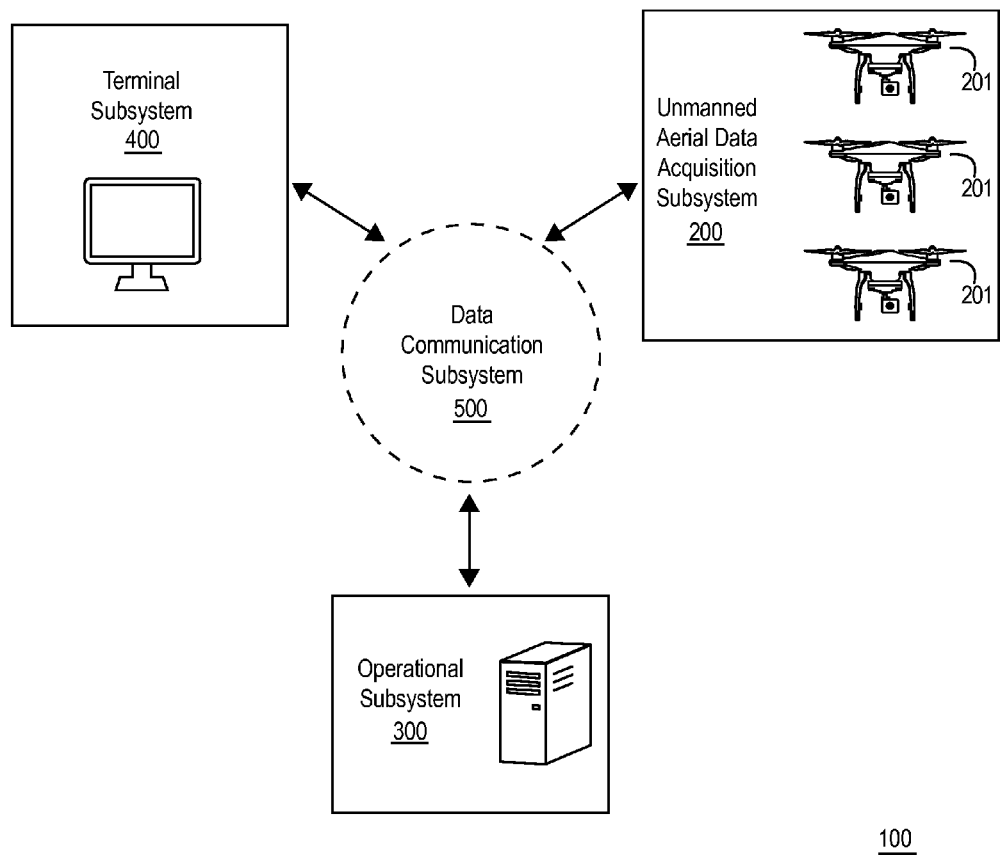
FIG. 2 is an exemplary top-level block diagram illustrating an embodiment of a virtual sightseeing system of FIG. 1.

The UAVs 201 of the virtual sightseeing system 100 and methods 800 (shown in FIG. 8), 900 (shown in FIG. 9) can be equipped to communicate wirelessly with other components of the virtual sightseeing system 100, e.g. an operational subsystem 300 or a terminal subsystem 400 (shown in FIG. 2). A selected UAV 201 within the virtual sightseeing system 100 can be likened to a communications endpoint, e.g. a cell phone, within a wireless communications network. Thus, any conventional wireless communication protocol appropriate for communications endpoints can be suitable for use to facilitate communications between the UAVs 201, the operational subsystem 300, and any other components (such as the terminal subsystem 400) of the virtual sightseeing system 100. For example, the UAV 201 can establish data uplink and/or downlink channels with the operational and/or terminal subsystems for navigation, localization, data transmission, and the like. Suitable wireless communication media can include any category of conventional wireless communications, for example, radio, Wireless Fidelity (WiFi), cellular, satellite, and broadcasting. Exemplary suitable wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

In certain embodiments, the UAVs 201 and subsystems of the present virtual sightseeing system 100 mutually communicate by transmitting data over a 3G or 4G (i.e., third generation or fourth generation) mobile telecommunications network. 3G and 4G technologies are based on standards for mobile telecommunications that comply with certain international specifications, e.g. specification of the International Telecommunications Union (ITU). Such technologies provide information transfer rates ranging from 200 Kbits/s up to several Gbits/s, making them broadly suitable for transmission of high-resolution images and video that use large bandwidth. 3G technologies generally are those that meet the International Mobile Telecommunications 2000 (IMT-2000) standards for reliability and data transfer rates. Common commercial 3G technologies include, for example, systems and radio interfaces based on spread spectrum radio transmission technology, such as the UMTS system standardized by the 3rd Generation Partnership Project (3GPP), the W-CDMA radio interface, the TD-SCDMA radio interface offered in China, the HSPA+ UMTS release, the CDMA2000 system, and EV-DO. In addition, other technologies such as EDGE, DECT, and Mobile WiMAX also fulfill IMT-2000 and thus are also approved as 3G standards by the ITU. According, the term "3G" as used herein include, but is not limited to, any IMT-2000 compliant technology, including those discussed herein.

In contrast, 4G technologies are generally understood to be those that comply with the International Mobile Telecommunications Advanced (IMT-Advanced) specification, requiring peak speed requirements at 100 Mbits/s for high mobility communications and 1 Gbit/s for low mobility communications. As of October 2010, ITU-approved 4G standards include LTE Advanced and WirelessMAN-Advanced (i.e. IEEE 802.16m). However, many commercial carriers advertise 4G services that may not fully comply with the IMT-Advanced specification, e.g. LTE, Mobile WiMAX, and TD-LTE. Accordingly, as used herein, the term "4G" includes, but is not limited to, these latter technologies such as LTE, Mobile WiMAX, and TD-LTE, as well as those which are IMT-Advanced compliant, including those technologies described herein.

In other embodiments, UAVs 201 can use 5G (i.e. fifth generation) mobile telecommunications networks to facilitate communications between the relevant subsystems of the virtual sightseeing system. 5G is the next phase of mobile telecommunications standards beyond current 4G/IMT-Advanced standards.

In some embodiments, the wireless communications used by the subsystems of the present virtual sightseeing system 100 can be encrypted, as may be advantageous for secure sightseeing applications. Suitable encryption methods include, but are not limited to, internet key exchange, Internet Protocol Security (IPsec), Kerberos, point-to-point protocol, transport layer security, SSID hiding, MAC ID filtering, Static IP addressing, 802.11 security, Wired Equivalent Privacy (WEP), Wi-Fi Protected Access (WPA), WPA2, Temporal Key Integrity Protocol (TKIP), Extensible Authentication Protocol (EAP), Lightweight Extensible Authentication Protocol (LEAP), Protected Extensible Authentication Protocol (PEAP), and the like. Encryption methods specifically designed for virtual sightseeing systems may also be suitable.

Thus, existing wireless technologies for use by current telecommunications endpoints can be readily adapted for use by the UAVs 201. For example, by outfitting each UAV 201 with a wireless card like those used for mobile phones, or other suitable wireless communications hardware, the UAVs 201 can easily be integrated into existing networks. In one embodiment, the UAVs 201 can be equipped with a subscriber identity module (SIM) card that allows the identification and/or authentication of UAV 201 in a manner analogous to mobile phones. Alternatively and/or additionally, proprietary communications hardware can be used as needed.

The operational subsystem 300 includes the hardware and software infrastructure needed to carry out various integration and support functions for the virtual sightseeing system 100. The operational subsystem 300 can perform many of functions related to the routine operation and upkeep of the virtual sightseeing system 100, such as functions relating to UAV monitoring, UAV control and guidance, UAV allocation, and sightseeing session management. Such functions of the operational subsystem 300 are described in more detail below with reference to FIG. 7.

The terminal subsystem 400 includes the hardware and software infrastructure that is needed to provide a virtual sightseeing user interface. The terminal subsystem 400 therefore has various input and output functions for the virtual sightseeing system 100. The terminal subsystem 400 can perform many of the input and output functions for a user interface, including functions related to tour initiation, UAV flight control, data output/presentation, and support. Such functions of the terminal subsystem 400 are described in more detail below with reference to FIG. 6.

Turning now to FIG. 2, an exemplary virtual sightseeing system 100 is shown as including several interacting subsystems. The subsystems illustrated in FIG. 2 include a plurality of UAVs 201 (depicted as part of an unmanned aerial data acquisition subsystem 200) an operational subsystem 300, and a terminal subsystem 400, each being provided in the manner discussed in more detail above with reference to FIG. 1. FIG. 2 additionally includes a data communication subsystem 500 as interacting with one or more of subsystems 200, 300, and 400. While these subsystems 200, 300, 400, 500 are represented schematically as separate systems, such representation is for conceptual purposes only, and, in some instances, more than one of these subsystems 200, 300, 400, 500 can be implemented using the same or at least partially overlapping hardware and/or software. As a non-limiting example, operational subsystem 300 and terminal subsystem 400 can be implemented via a computer that controls these subsystems 300, 400 through separate software modules or even in the same software module. In another non-limiting example, operational subsystem 300 and terminal subsystem 400 can be discrete subsystems each implemented on independent hardware platforms that can communicate with one another, e.g., over a communication network. Similarly, in some exemplary systems, data communication subsystem 500 can share some hardware and/or software components with the other subsystems 200, 300, 400 described herein. These subsystems 200, 300, 400, 500 generally, but not exclusively, perform the functions described below.

The data communication subsystem 500 refers in aggregate to the collection of communication hardware and software for operating the virtual sightseeing system 100. The specific hardware and software implementation of the data communication subsystem 500 can vary depending on the configuration of a particular virtual sightseeing system 100. Moreover, communications among any given pair of subsystems 200, 300, 400 over data communication subsystem 500 can use the same and/or different communications technologies and/or protocols as between another pair of subsystems 200, 300, 400. For example, it may be advantageous to establish a hard-wired connection between the terminal subsystem 400 and the operational subsystem 300 as described below; whereas, each of these subsystems 300, 400 can communicate wirelessly with the UAVs 201.

Figure 3:
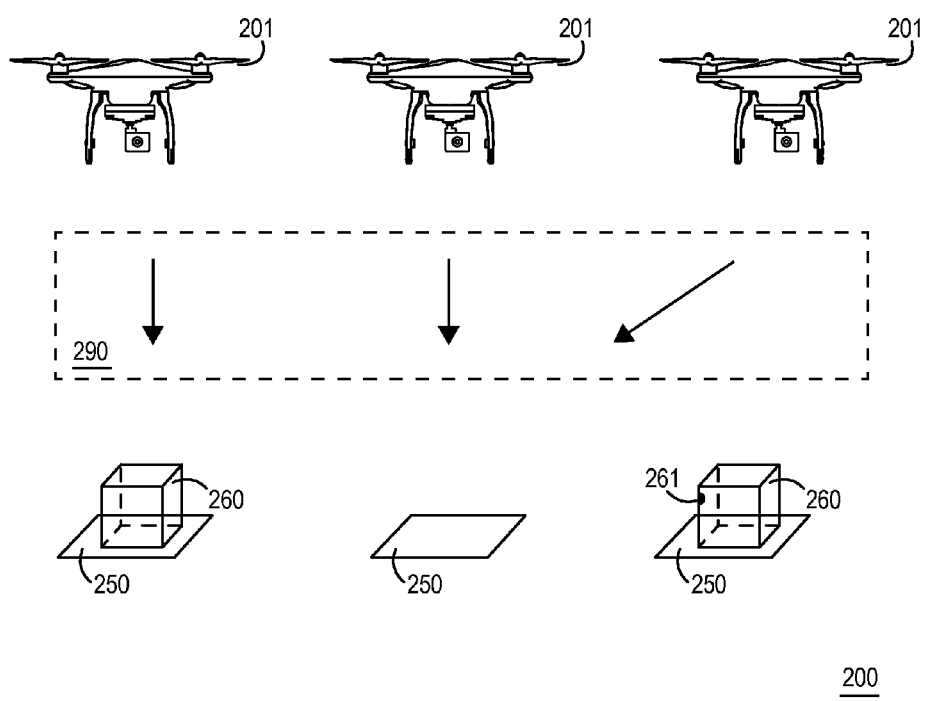
FIG. 3 is an exemplary diagram illustrating an embodiment of the virtual sightseeing system of FIG. 1.

Turning now to FIG. 3, the unmanned aerial data acquisition subsystem 200 can include a plurality of UAVs 201 that enable the virtual sightseeing system 100 to capture visual and non-visual data regarding a sightseeing region of interest. The number of UAVs 201 in the virtual sightseeing system 100 can vary depending on sightseeing needs, the total geographical area to be covered, the flight range and maximum flight time of the UAVs 201, and density of sightseeing coverage desired, and so forth. For example, given a selected UAV 201 that has a flight duration of 30 minutes and a speed of 50 kilometers/hour, thereby giving an effective flight radius of approximately 12.5 kilometers, the selected UAV 201 can therefore cover a geographical area of approximately 400 square kilometers. In this example, a virtual sightseeing system 100 with non-redundant coverage of 4000 square kilometers can utilize ten of the selected UAVs 201; in this same example, a virtual sightseeing system 100 requiring three-fold redundant coverage of 8000 square kilometers can use sixty of the selected UAVs 201.

In certain embodiments, and as described in further detail below, the unmanned aerial data acquisition subsystem 200 further comprises one or more ground stations 250. Ground stations 250 are geographical locations where each UAV 201 is assigned to according to the desired sightseeing needs and can provide anchor or "home" locations for the UAV 201. The home location provides an important reference location for each UAV 201 as well as for the other components of the sightseeing system. For example, each UAV 201 can be programmed to return to a selected ground station 250 as a matter of default when, e.g., the UAV 201 is low on power, flies out of range, or encounters unexpected operating conditions.

In some embodiments, the ground station 250 can be a vacant land area where the UAV 201 is allowed to land safely until it can be manually located, recharged, and/or maintained for further operation. In other embodiments, the ground station 250 can include certain support systems 260, such as a recharging station 261 for recharging batteries that power the UAVs 201. In other embodiments where UAVs 201 are powered by power sources other than electricity, the ground station 250 can similarly include other suitable support systems 260 for replenishing the UAV's power supply. Such recharging stations 261 and other power stations preferably allow automatic docking of the UAVs 201 so as to enable recharging/repowering without human intervention. In some embodiments, the support systems 260 at ground station 250 are lightweight and portable so as to be unobtrusive and easily moved when relocation of the ground station 250 is desired.

In some embodiments, each ground station 250 is configured to accommodate a single UAV 201. In other embodiments, each ground station 250 is configured to simultaneously accommodate multiple UAVs 201.

Figure 4A:
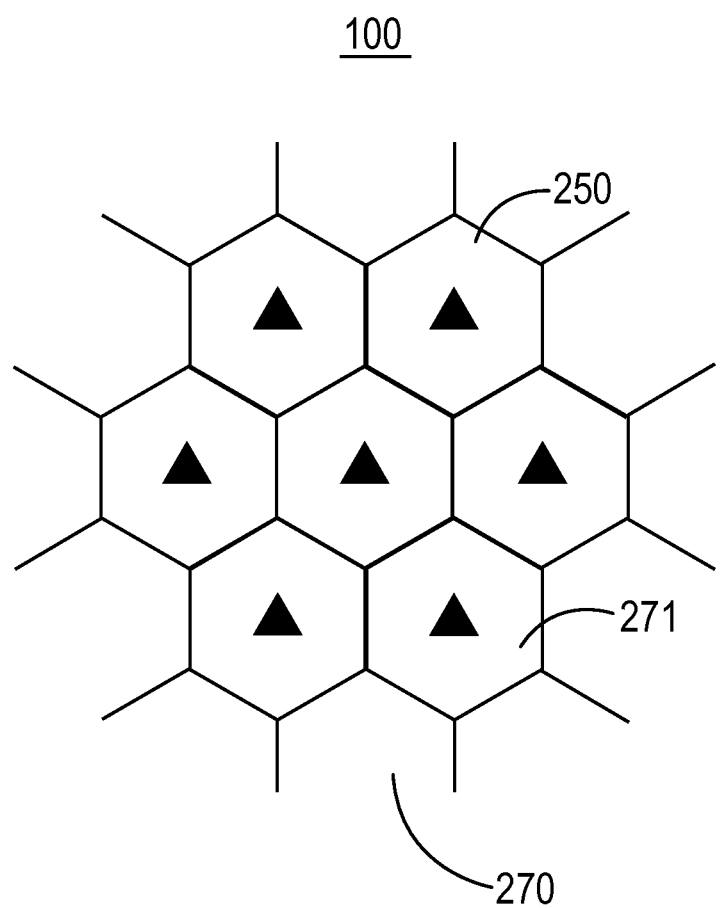
FIG. 4A is an exemplary diagram illustrating a ground station configuration over a certain geographic region for the UAVs of FIG. 1.

The collective positioning of ground stations 250 over a given geographical area is herein referred to as a "ground station configuration" or simply a "ground configuration." The ground configurations can be arranged in any manner suitable for virtual sightseeing needs over the geographical area. In a preferred embodiment, the ground configuration can comprise a honeycomb configuration 270, as illustrated in FIG. 4A. In the honeycomb configuration 270 of FIG. 4A, each ground station 250 is positioned inside of a hexagonal region or "cell" 271, defined by the honeycomb pattern. A honeycomb configuration 270 provides the advantage of allowing full two-dimensional coverage of a given geographical area with minimal overlap between the areas accessible to the UAVs 201 (shown in FIG. 1) stationed at ground stations in adjacent cells, thereby maximizing the area covered by a given number of UAVs 201. In some embodiments, the ground stations 250 are centrally located within cell 271, which can allow an idle UAV 201 at the ground station 250 to reach any region of interest within the cell with minimal average travel time and distance after being activated for deployment. Although shown and described as comprising a hexagonal region with reference to FIG. 4A for purposes of illustration only, other ground configurations that effect full coverage of a given geographic region are possible, for example, rectangular (e.g., grid) configurations, or other plane-tessellating configurations.

Figure 4B:
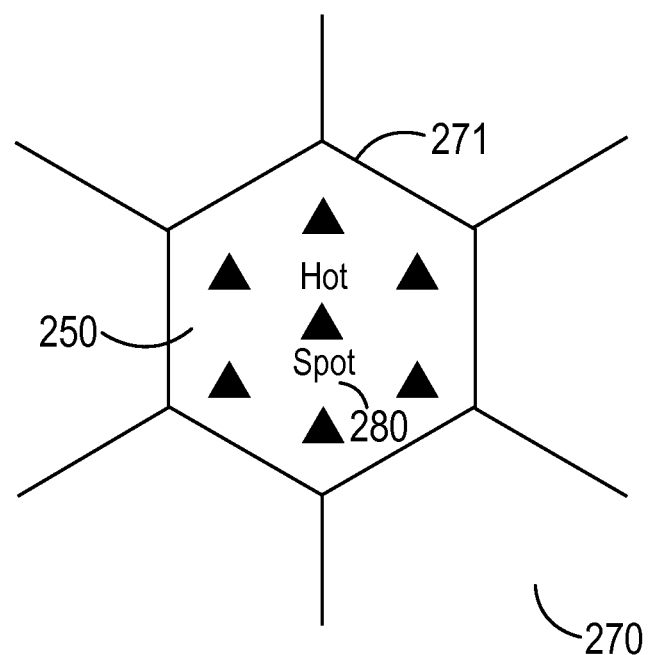
FIG. 4B is an exemplary diagram illustrating another ground station configuration over a certain geographic region for the UAVs of FIG. 1.

Other ground configurations may be advantageous depending on the particular geographical area over which the ground configuration spans. Furthermore, the ground configuration need not be uniform over the entire geographical area. For example, ground stations can be positioned more densely near sightseeing "hot spots" that contain more likely regions of interest than other areas. For example, the multiple ground stations 250 can be positioned within a single cell 271 of a honeycomb configuration 270. As illustrated in FIG. 4B, such multiple ground stations 250 can even be positioned in a miniature honeycomb pattern 280 within the larger honeycomb cell 271. Alternatively, geographical areas historically unpopular for virtual sightseeing can be given sparse ground station coverage, or indeed no ground station coverage at all. Likewise, not all ground stations 250 need have uniform support system 260 (as shown in FIG. 3). For example, ground stations 250 located near sightseeing hot spots may include additional support systems 260 such as recharging stations 261 (as shown in FIG. 3), whereas ground stations 250 far from such hot spots may not include any support systems 260. In some embodiments, the ground configuration can be a random configuration.

While the ground configurations illustrated in FIGS. 4A and 4B include multiple ground stations 250, a single ground station 250 can be sufficient for certain virtual sightseeing systems 100, particularly those systems that need cover only a limited geographic scope. Furthermore, ground stations 250 over a geographical area need not remain in a fixed ground configuration, but can be re-configured according to sightseeing needs. For example, ground stations 250 can be reconfigured according to sightseeing needs during different seasons, or according to sightseeing needs on particular days of the year (e.g. yearly holidays).

The collective assignment of UAVs 201 to multiple ground stations 250 that are arranged in a particular ground station configuration is referred to herein as a "UAV ground configuration" 290 (shown in FIG. 3). The assignment of UAVs 201 to ground stations is also referred to herein as "stationing" the UAVs 201 in a UAV ground configuration. UAVs 201 can be assigned to ground stations 250 in any suitable manner. Just as ground station configurations can take certain preferred configurations, so too can UAV ground configurations take preferred configurations, e.g. honeycomb configurations. Because the UAV ground configuration depends only on the assignment of UAVs 201 to ground stations 250, a UAV ground configuration does not depend on whether UAVs 201 have been allocated according to a sightseeing request or whether UAVs 201 have taken flight. Typically, but not always, each UAV 201 will be assigned to a single ground station 250 at any given time, at which the UAV 201 remains in an idle state until it is activated for deployment to a region of interest for sightseeing. In some embodiments, each UAV 201 can be assigned to multiple ground stations 250 between which the operational subsystem 300 or the UAV 201 itself can choose based on various criteria, such as distance from the ground station, the number of UAVs 201 that the ground station can accommodate, etc. As needed, a single ground station 250 can be assigned to zero, one, or more than one UAV 201 at any given time.

To station UAVs 201 in a particular UAV ground configuration in preparation for deployment, the UAVs 201 can be initially moved to the ground station 250 that it is assigned to in any suitable manner. For example, a selected UAV 201 can be manually delivered to each ground station 250, whereupon the compatibility of the UAV 201 with the ground station 250 can be ascertained. Where the ground station 250 is within the flight range of the UAV 201 from its location of origin, the UAV can simply be flown to the ground station. Once positioned at the ground station, the UAV 201 remains in an "off" or "idle" state until it is activated in response to a UAV deployment request. Once the stationed UAVs 201 are activated for deployment in response to a sightseeing request, the UAV 201 can be switched from an "off" or "idle" state to an "on" or "active" state and physically powered on in preparation for flight.

Turning now to FIG. 5, an exemplary terminal subsystem 400 is shown as configured to perform a set of functions for interfacing with a user for virtual sightseeing purposes. These functions include, but are not limited to, tour initiation functions 410, flight control functions 420, output functions 430, and/or support functions 440.

Tour initiation functions 410 are those performed prior to commencement of the virtual sightseeing tour itself. Tour initiation functions 410 can include presenting tour initiation options in a user interface 411; for example, these options include the tour region (e.g., a geopolitical region such as a country, state, province, city, or town), tour type (e.g., single UAV, multiple UAV, group tour), tour duration, and others. The tour initiation functions 410 can include displaying a map so that a region of interest can be interactively selected 412. Suitable maps include existing digital maps as well as proprietary maps especially designed for virtual tour selection. Tour initiation functions 410 can include displaying the range of idle UAVs 201 available and their status and ground locations 413. For example, the UAV availability status can be displayed as an overlay on top of a map for selecting a region of interest, allowing the selection of a region according to UAV availability. Tour initiation functions 410 can include allowing the entry and confirmation of a virtual sightseeing selection 414. Tour initiation functions 410 can include displaying the wait time until the virtual tour becomes active 415.

Once the virtual sightseeing tour has commenced, the terminal subsystem 400 then allows various sightseeing functions 420 to be performed. Sightseeing function 420 include, for example, controlling the navigation of the UAV such as the UAV's direction, speed, altitude and attitude controls 421, camera controls 422 (e.g. camera angle, camera mode, photo/video size/resolution, photo/video format, and exposure settings), controls for operation of various UAV instruments/sensors 423 (e.g. activating/deactivating a selected sensor, adjusting microphone sensitivity), and/or others.

The terminal subsystem 400 can perform a variety of output functions 430 relating to the presentation of visual and/or non-visual data collected by the UAVs, thereby allowing a user to experience the collected data as an integrated experience. Such output functions 430 include, for example, displaying visual data collected from the region of interest in the form of photographs, time-delayed videos, and/or live videos 431, recreating sounds gathered by the UAV and playing these sounds over speakers (preferably in synchronization with the video feed) 432, presenting other sensory data through the appropriate actuators 433, and/or as any other output functions 434 that are suitable for creating a realistic depiction for virtually experiencing the region of interest. Visual and non-visual data can be presented using a variety of actuators 433. Non-limiting examples of actuators 433 are speakers for presenting sound data, heating and/or cooling elements for presenting temperature data, humidifiers and/or dehumidifiers for presenting humidity data, a sprinkler or other fluid system for presenting precipitation data, and a ventilation system or other air flow system for presenting pressure, wind speed, and/or wind direction data.

The terminal subsystem 400 can perform various support functions 440. Such support functions 440 include, for example, display information regarding charges incurred for a given virtual tour session 441, soliciting feedback from regarding a virtual tour after tour completion 442, allowing multiple users to interact with one another before, during, and after tours 443, providing technical and other help 444, and others.

In some embodiments, the terminal subsystem 400 is advantageously configured for simultaneous use by multiple users and hence can be equipped with multiple terminals.

Each of these terminals can functional within the virtual sightseeing system autonomously. Alternatively and/or additionally, multiple terminals can receive a data feed of data collected by a selected UAV 201 (shown in FIG. 1), with a single terminal in control of the UAV's movement, camera and other functions and with the other terminals receiving the collected data passively. In another embodiment, multiple users can each be assigned to a UAV 201 in a multi-UAV group tour. Control of the UAVs 201 in the group tour can be controlled centrally by a single terminal at some times during the tour and controlled separately by different terminals at other times, depending on need. In some embodiments, users at different terminals can interact with one another to create a shared sightseeing experience. For example, the users can send text and images messages to one another, audibly speak to one another, and draw other users' attention to locations of interest in real-time. When desired, a user can direct his or her data feed to another user located at a separate terminal. In another embodiment, the terminal can present multiple UAV data feeds at the same time. Such presentation of multiple UAV data feed can be used, for example, in multi-UAV group tours so that a user can sightsee from multiple vantage points at the same time. In another embodiment, the user can switch between multiple UAV data feeds (akin to switching television channels).

Figure 6A:
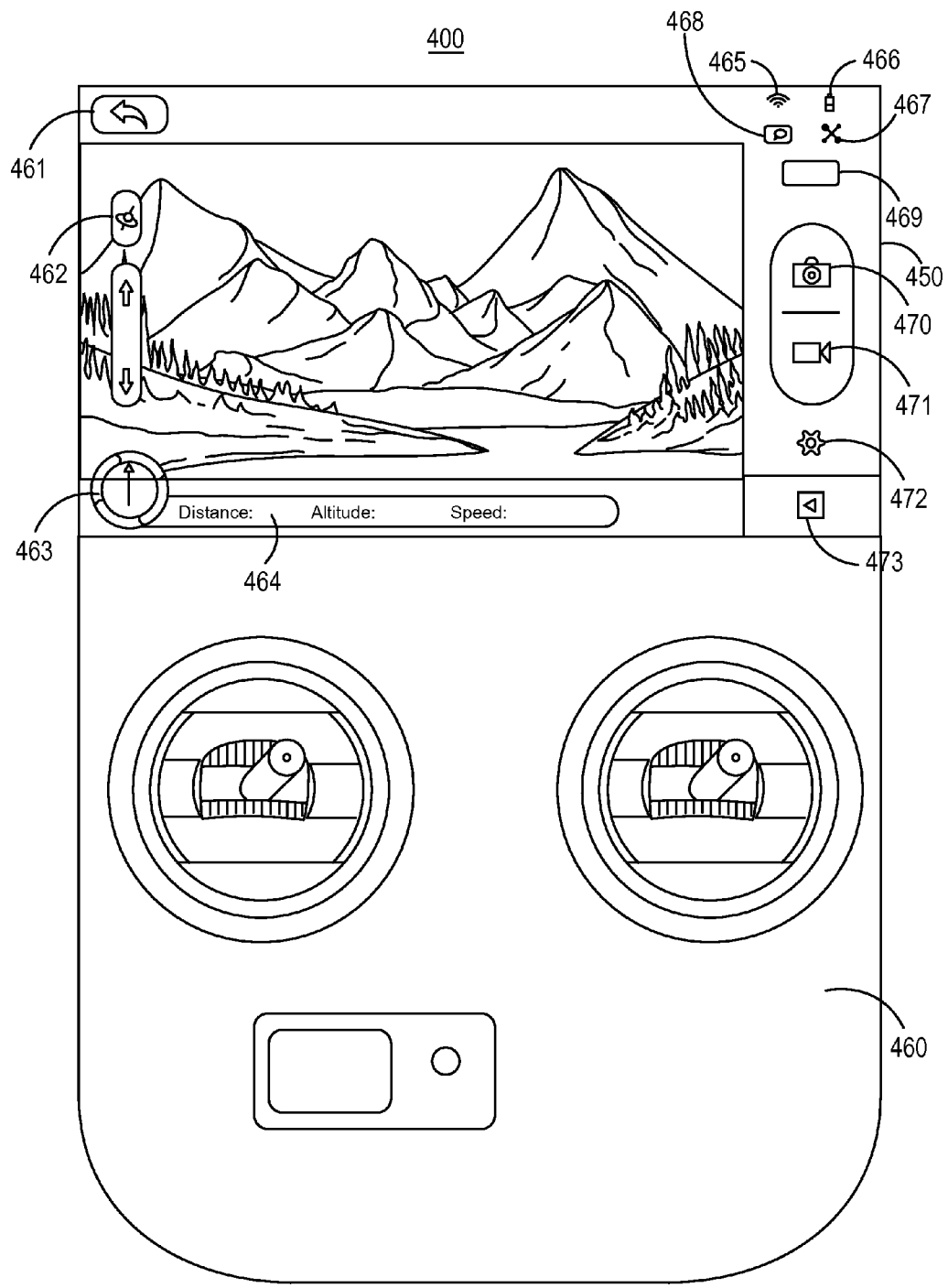
FIG. 6A is an exemplary diagram illustrating one embodiment of a virtual sightseeing terminal.

The functions of the terminal subsystem, as described in the examples given above, can be implemented at particular terminals in any suitable manner. As depicted in FIG. 6A, for example, the terminal subsystem 400 can be implemented as a combination of a monitor 450 and a remote controller 460, supported by the appropriate software. Current software interfaces, for example, allows control of a single UAV 201 using a mobile device over a Wi-Fi network. FIG. 6A shows how various input and output functions can be implemented via an exemplary user interface that includes, without limitation, a navigation between menus and modes 461, camera controls 462, flight attitude and radar functions 463, flight parameters 464, wireless signal intensity 465, UAV power level 466, UAV GPS status 467, memory status 468, memory slot status 469, camera shutter button 470, camera record button 471, camera settings 472, and flight parameters 473. In this embodiment, both visual and non-visual data are presented visually: that is, presentation of visual data is in the form of the images displayed on-screen, while presentation of non-visual data is in the form of parameters that are also visually displayed.

In another embodiment, the terminal subsystem 400 can include a virtual reality terminal, which allows a user to visualize and interact with a simulated three-dimensional environment that is reproduced from the UAV's data feed. Current virtual reality terminals include head-mounted displays, which allow simultaneous display of computer-generated images and live images from the real world. Various head-mounted displays suitable for virtual sightseeing are exemplified by the Forte VFX-1, the Sony Glasstron, Google Glass, and the Oculus Rift head-mounted displays.

Figure 6B:
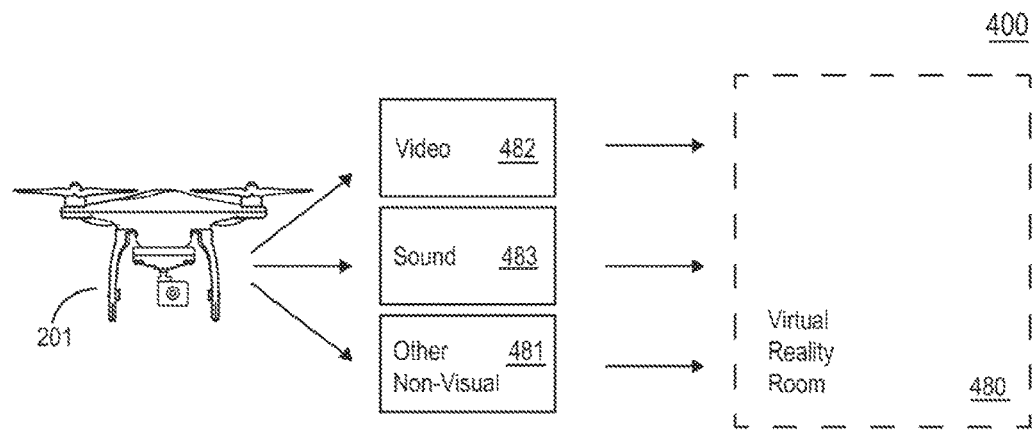
FIG. 6B is an exemplary diagram illustrating an alternative embodiment of a virtual sightseeing terminal.

In some embodiments, the virtual reality terminals allow integrated presentation of the various signals collected by the UAV 201 both visually and non-visually, and preferably in real time. Such integrated virtual reality terminals can be implemented in a variety of ways. As illustrated in FIG. 6B, for example, the virtual reality terminal can be implemented as a "virtual reality room" 480 where various non-visual environmental conditions such as temperature, pressure, humidity, precipitation, wind direction, and/or wind speed can be reproduced according to the data stream 481 provided by a UAV 201. Non-limiting examples of actuators 433 for presenting non-visual data in a virtual reality terminal are speakers for presenting sound data, heating and/or cooling elements for presenting temperature data, humidifiers and/or dehumidifiers for presenting humidity data, a sprinkler or other fluid system for presenting precipitation data, and a ventilation system or other air flow system for presenting pressure, wind speed, and/or wind direction data. The appropriate images 482 and/or sound 483, which can also be provided by UAV 201, can be integrated with non-visual presentation of environmental conditions to provide a sense of being at the UAV's location.

Figure 6C:
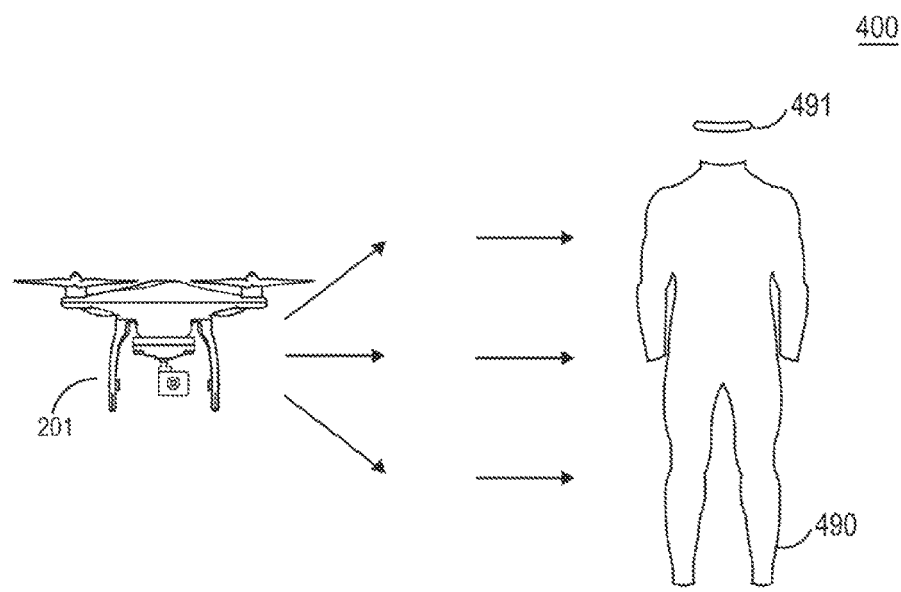
FIG. 6C is an exemplary diagram illustrating yet another alternative embodiment of a virtual sightseeing terminal.

In another example illustrated in FIG. 6C, certain environmental conditions are reproduced in a "space-suit" like virtual reality outfit 490 that the user wears. The visual and sound data is coupled with the sensory data and supplied to the user through a virtual reality visor 491 similar to the head-mounted displays discussed above with reference to FIG. 5.

In some embodiments of the virtual sightseeing systems 100 (shown in FIG. 1) and methods 800 (shown in FIG. 8) and 900 (shown in FIG. 9), the data is presented in real time. Real time data presentation need not be simultaneous with the collection of the data by UAVs 201, but can merely have sufficiently low latency such that meaningful feedback could be provided to the UAV 201 from a terminal. Latencies for real time data presentation are preferably below 1 second and more preferably below 200 milliseconds, but in some cases can exceed 1, 2, 5, or even 10 seconds where the amount of data transmitted by the UAV 201 is large and bandwidth over the data communication subsystem 500 (shown in FIG. 2) is limited.

Figure 7:
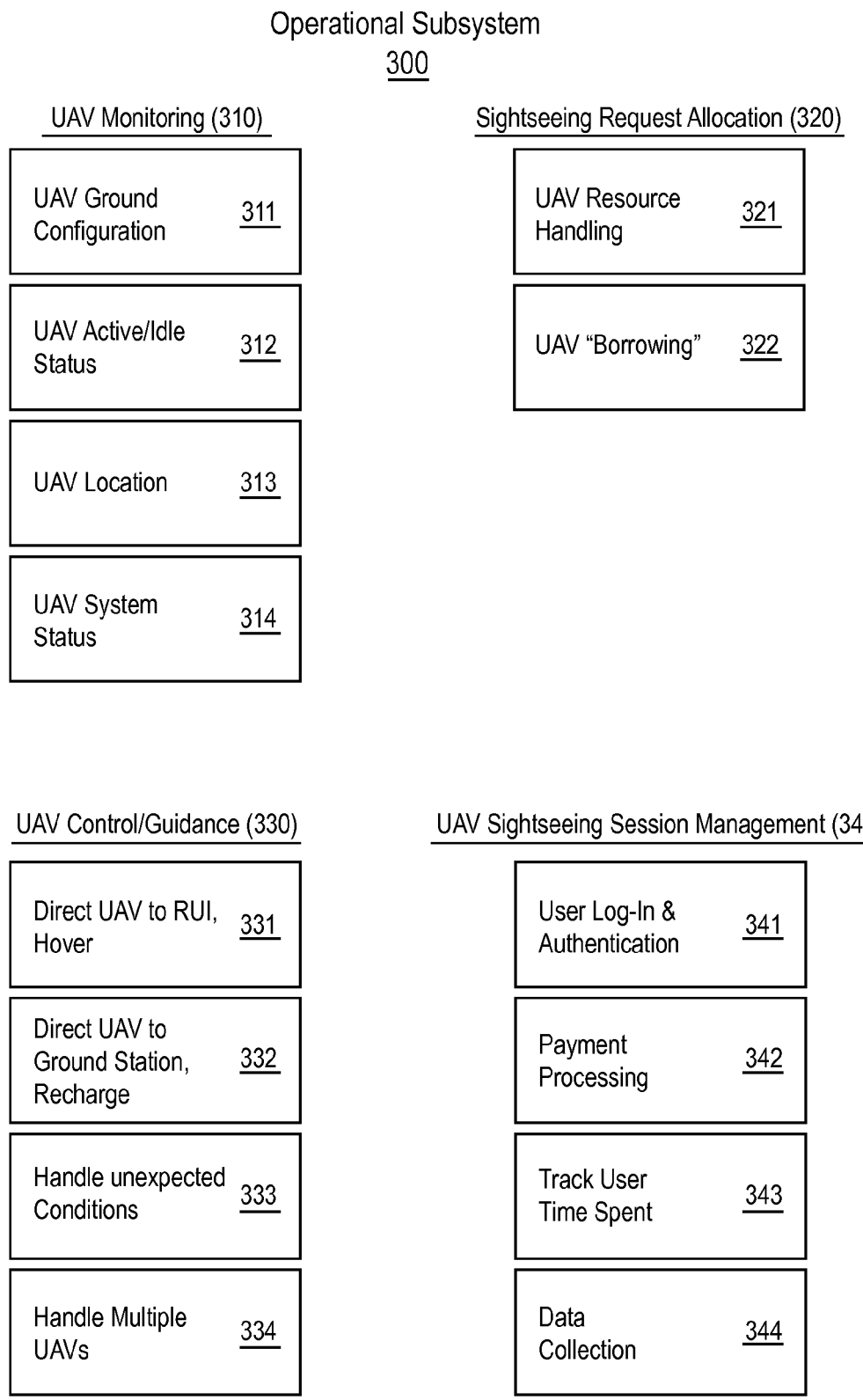
FIG. 7 is an exemplary diagram illustrating exemplary functions of an operational subsystem for the virtual sightseeing system of FIG. 1.

Turning now to FIG. 7, an exemplary operational subsystem 300 is shown for performing a variety of "back-end" functions for the virtual sightseeing system. Generally, these functions allow the entire virtual sightseeing system to maintain operations regardless of which users or UAVs 201 are active at any particular time. Exemplary functions of the operational subsystem 300 include, but are not limited to, housekeeping functions needed to monitor the UAVs 310, e.g., keeping track of the UAV ground configuration covering the operational region 311, keeping track of the active/idle status of each UAV 312, keeping track of the position, trajectory, attitude for each UAV 313, and/or keeping track of other system status signals for each UAV 314 such as fuel level, camera parameters, and data feed status.

The operational subsystem 300 can perform, for example, functions relating to allocating and de-allocating UAVs to users' sightseeing requests 320. For example, at 321, when a sightseeing request is received, the operational subsystem can determine whether the virtual sightseeing system 100 has sufficient UAVs 201 to handle the request. UAV request handling can be performed in any suitable manner. In one embodiment, the operational subsystem analyzes the set of idle UAVs 201 in the vicinity of the region of interest and assigns the idle UAV that is closest to the region of interest to the request. If no idle UAVs 201 are available within a certain range, the operational subsystem can inform the user of the situation and/or ask the user to wait. Alternatively, at 322, the operational subsystem can reallocate a UAV 201 that is stationed in another region. For example, if the UAVs are assigned according to a honeycomb ground configuration, it can be possible to "borrow" an idle UAV 201 that is currently stationed in a nearby hexagonal cell. Such "borrowing" can be performed by operational subsystem 300 based on various considerations, including the likelihood (based on historical occurrences) of the neighboring cell becoming subject to a sightseeing request. The operational subsystem 300 likewise may need to determine whether such "borrowing" is feasible based on the distance between cells and the UAVs' flight range.

The operational subsystem 300 can perform, for example, functions relating to routine control and guidance 330 of the UAVs 201. These functions can include, for example, 331 directing the UAVs to the region of interest in response to the user sightseeing request and directing the UAVs to remain in hover mode until control is transferred to the user. Another exemplary guidance function 332 ensures that the UAV return to its assigned ground station 250 and received the necessary re-charging and maintenance after the user has finished sightseeing and transfers the UAV control back to the operational subsystem. Another exemplary guidance function 333 enables the operational subsystem 300 can take control when the UAV encounters unexpected conditions, flies out of range, enters forbidden air space (such as air space in the vicinity of airports), becomes subject to abusive guidance by the user, or other conditions arise warranting the operational subsystem 300 to take control of the UAV. In some embodiments, these routine control and guidance functions can be implemented on the UAV itself for autonomous control rather than being directed by the operational subsystem 300.

In another embodiment, operational subsystem 300, at 334, can coordinate the actions of multiple UAVs to carry out a single sightseeing request. For example, multiple UAVs 201 can be deployed to a given region of interest simultaneously, allowing viewing from multiple vantage points. In such cases, the operational subsystem 300 can automatically take control of any UAV 201 that is not currently under direct user control. In another example, the operational subsystem 300 can be configured to dynamically re-deploy one or move additional UAVs to the region of interest in response to the incapacity or other debilitation of a given first UAV operating at the region of interest. Such incapacity or debilitation includes anticipated incapacity or debilitation of the first UAV. For example, if a user desires to maintain a sightseeing operation for a duration of time that exceeds the battery life of the first UAV 201, the operational subsystem 300 can automatically re-deploy a replacement UAV 201 when the first UAV 201 enters a low-power state or when the operational subsystem anticipates that the first UAV 201 will enter a low-power state. The re-deployment can implemented to minimize interruptions in the user's experience; e.g., one UAV 201 can take the place of another in seamless fashion, without the user needing to worry about the underlying UAV status. For example, a first UAV 201 can maintain a data feed at a particular region of interest while a second replacement UAV 201 is being deployed to the first UAV's position. Other examples of a UAV's incapacity or debilitation include when the UAV 201 is damaged as the result of a collision, when it is struck by lightning, or when its operations are otherwise interfered with by an external force.

The operational subsystem 300 can perform, for example, functions relating to maintaining the overall user sightseeing session 340. These functions can include, e.g., verifying user login and authentication credentials 341, processing user payments 342, keeping track of user time spent per session 343, and/or collecting data relating to each sightseeing session 344.

Figure 8:
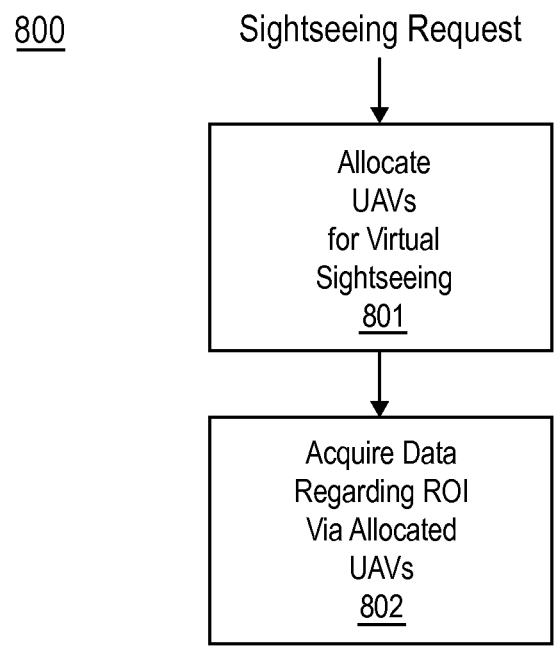
FIG. 8 is an exemplary flowchart illustrating one embodiment of a method of virtual sightseeing using the UAVs of FIG. 1.

Turning now to FIG. 8, an exemplary virtual sightseeing method 800 of virtual sightseeing using the UAVs 201 (shown in FIG. 1) is shown as including a plurality of processes, which need not be performed in the order depicted.

At 801, the virtual sightseeing method 800 is initiated by allocating one or more UAVs 201 from among a plurality of UAVs 201 to a region of interest in response to a sightseeing request. During the UAV allocation step 801, an assignment of the one or more UAVs 201 to a given sightseeing request is performed in either hardware or software, thereby preventing other sightseeing requests from trying to use the allocated UAVs 201. The allocation step 801 can depend on a large number of variables, including the UAVs 201 available to the virtual sightseeing system, the region of interest to be seen, and/or the sightseeing preferences. Additional details of allocation step 801 are described below in reference to FIG. 9.

At 802, the virtual sightseeing method 800 proceeds by acquiring data regarding the region of interest from the one or more allocated UAVs 201, which may be equipped with various instruments as needed to acquire particular kinds of data specified in the sightseeing request. Additional details of the data acquiring step 802 are described below in reference to FIG. 9.

Figure 9:
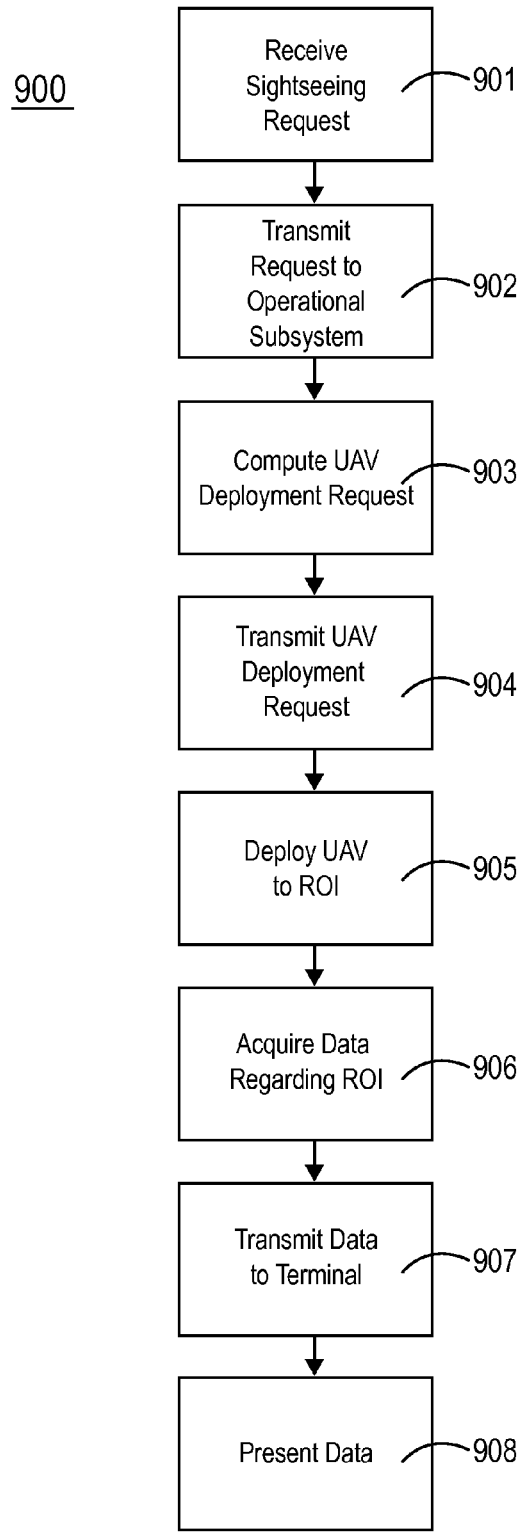
FIG. 9 is an exemplary flowchart illustrating one embodiment of a method of virtual sightseeing using the UAVs of FIG. 1.

Turning now to FIG. 9, another exemplary virtual sightseeing method 900 of virtual sightseeing using the UAVs 201 (shown in FIG. 1) is shown as including a plurality of processes, which need not be performed in the order depicted. Although the processes are illustrated below with reference to operational subsystem 300, terminal subsystem 400, and data communication subsystem 500 as shown in FIG. 2, the processes are not limited to being carried out on these particular systems.

At 901, the virtual sightseeing method 900 is initiated via the receipt of a sightseeing request, e.g. a sightseeing request entered into a terminal subsystem 400. The sightseeing request can include a variety of sightseeing settings, which typically include at least a sightseeing region of interest. In certain embodiments, the region of interest can be entered as a precise set of geographic coordinates, e.g. latitude and longitude. Alternatively, in other embodiments the user can specify the location of interest in more colloquial terms, e.g. as a street intersection, as the name of a tourist attraction or local business, or even more generally as the name of a geopolitical unit such as a county, city, province, or as the name of a natural feature such as a river, lake, forest, mountain, etc. The terminal subsystem 400 and/or operational subsystem 300 can have software that enables these locations to be translated into more precise coordinates, as known in the art and used by currently used mapping software. The terminal subsystem 400 can include software that permits searching of a geographic area for regions of interest. For example, in response to the entry of a particular geographic area, the software can present a list of relevant regions of interest. Based on the region(s) of interest and constraints such as time, the software can generate a list of all regions of interest that can be visited during the allotted time, as well as generate the optimal route of traversal for the UAV 201, if desired.

In one embodiment, the terminal subsystem 400 can provide a map interface from which regions of interest for virtual sightseeing can be browsed and selected. The map interface can highlight popular sightseeing destinations. The map interface can provide a UAV availability overlay that displays the UAV status and/or expected wait times for specific sightseeing locations, allowing a user to balance interest with his or her desire to wait. Suitable map interfaces include existing digital maps and like map interfaces. Alternatively, the terminal subsystem 400 can provide a proprietary interface designed specifically for the virtual sightseeing application. Such map interfaces can even allow the selection of multiple locations of interest, which can be visited sequentially by the UAV 201.

In addition to the region of interest, the sightseeing settings can include a variety of other settings. Such settings can include, for example, flight settings for the UAV 201, UAV camera settings, settings of which instruments/sensors the UAV engages during the tour (e.g., settings of whether to collect data for one or more of image, video, sound, temperature, pressure, humidity precipitation, wind speed, and wind direction), settings of the total duration of the tour, settings of the number of UAVs to deploy (if multiple UAV deployment is available), and so forth.

In embodiments where operational subsystem 300 and terminal subsystem 400 do not occupy the same hardware, a sightseeing request is transmitted from the terminal subsystem 400 to the operational subsystem 300 at 902. The mode of such transmission can include any suitable transmission mode and can depend on the configuration of the operational subsystem 300 relative to the terminal subsystem 400. For example, the sightseeing request can be transmitted over a hardwire connection or over a network, e.g. a local area network, wide area network, or the world wide web (i.e. the Internet). In some embodiments, the sightseeing request is transmitted over a wireless communication network, e.g. a 3G or 4G network, as described above with reference to FIG. 1. In some embodiments, the sightseeing request is transmitted via TCP/IP, i.e., in accordance with the TCP/IP protocol. In other embodiments, the sightseeing request is transmitted using a proprietary protocol, e.g. one specifically designed for a virtual sightseeing system.

At 903, operational subsystem 300 receives a sightseeing request and computes a UAV deployment request based on that sightseeing request. In other words, the operational subsystem 300 can determine which UAV 201 to deploy in response to the sightseeing request and make a deployment request accordingly. This determination can be made in any suitable manner and generally is based upon one or more factors such as: (a) the location of the sightseeing region of interest corresponding to the request; (b) the number of UAVs 201 requested (if multiple UAV deployment is allowed); (c) the active/idle status of the UAVs 201; (d) the power status of the UAVs 201; (e) the maintenance status of the UAVs 201; (f) the equipment status of the UAVs 201; and (g) the settings establishing whether UAVs are allowed to be "borrowed" to a different cell (where cell-based ground station configurations are used). In one embodiment, the operational subsystem 300 considers all idle UAVs 201 within a certain geographical distance from the region of interest and selects the nearest idle UAV for deployment. In other embodiments, the operational subsystem 300 can consider other parameters in addition to proximity, such as power, maintenance, and/or equipment status, the UAV type of various candidate UAVs (if different UAV models and equipment are used within the same system), etc., without limitation. In other embodiments, the operational subsystem 300 can allocate multiple UAVs 201 for deployment to the region of interest. The number of UAVs 201 to allocate to a given region of interest can be determined dynamically at the time of the sightseeing request based on, e.g., the number of available UAVs, the size of the region of interest, and the expected demand for UAVs at other sightseeing locations.

Once a UAV 201, if any, is selected for deployment, the operational subsystem 300 computes a UAV deployment request for transmission to the selected UAV. This UAV deployment request contains relevant data for sending the UAV to the region of interest so that virtual sightseeing can begin. For example, the UAV deployment request can convey at least the location of the region of interest to the UAV so that the UAV will be informed where to be deployed. The request can convey other information to the UAV related to its deployment, such as the time stamp of the deployment request, the duration that the UAV should remain in hover before returning to ground location in the event the sightseeing session is terminated, and other similar information.

In the context of a typical virtual sightseeing system 100 that includes multiple UAVs 201, the deployment request preferably includes a mechanism of specifying which UAV 201 the UAV deployment request is to be sent. Such specificity can be achieved, for example, by assigning each UAV 201 with a unique identifier or address. In one embodiment, where the UAVs 201 communicate via TCP/IP, each UAV 201 can be assigned to a distinct IP address. In another embodiment, a proprietary addressing system is used to identify and direct the deployment request to particular UAVs. Such proprietary addressing system can use a data header, for example, that uniquely identifies each UAV 201 and directs the request to the correct location in the context of the particular communication protocol employed. More generally, the same technologies that are used to address particular telecommunications endpoints can be used to address different UAVs 201 within the virtual sightseeing system 100.

After being computed by the operational subsystem 300, a UAV deployment request is transmitted by the operational subsystem 300 to one or more UAVs 201 at 904. Because the UAVs 201 to which the deployment request are directed are physically autonomous (e.g. in the air or stationed at a ground station) under typical operating conditions, the request is preferably made wirelessly. In some embodiments, the request can be transmitted over a wireless communication network, e.g. a 3G or 4G network, as described above with reference to FIG. 1. In some embodiments, the request is transmitted via TCP/IP, i.e., in accordance with the TCP/IP protocol. In other embodiments, the request is transmitted using a proprietary protocol, e.g. one specifically designed for a virtual sightseeing system.

Once a UAV deployment request is received by recipient UAV 201, the UAV can be deployed, at 905, to the region of interest in response to the UAV deployment request. In one embodiment, the operational subsystem 300 can send additional navigational information to the UAV 201 that allows the UAV 201 to navigate to the region of interest without being controlled by the user. Such navigational information can include a pre-planned flight path or a flight path that is calculated by the operational system on the spot, and preferably avoids obstacles. Alternatively and/or additionally, a dynamic flight path can be used that responds to environmental changes in real time. For example, where a tree falls and blocks the intended flight path, the UAV 201 conveys this information to the operational subsystem 300, revises the flight path in real-time to avoid the fallen tree. In this example, the flight plan revision can occur once the change is detected (long before the UAV 201 reaches the tree) or as the UAV reaches the tree.

Upon arriving at the region of interest, UAV 201 can remain in hover mode until the user commences control. Alternatively, the UAV 201 can be directed to land so as to conserve power. One advantage of the method 900 is that a user need not understand how to pilot the UAV 201 from an arbitrary ground location to the region of interest; instead, the sightseeing experience can commence after the UAV 201 arrives the region of interest. However, in some instances a may desire control over the UAV 201 from start to finish, enabling a user to become accustomed to controlling a UAV. Thus, in another embodiment, the virtual tour can begin at the ground location of UAV 201. In this embodiment, the "deployment" of the UAV 201 in response to the UAV deployment request is simply the activation of the UAV, whereupon control is directly transferred to the user. In this embodiment the "region of interest" can simply be the initial ground location of the UAV 201.

In some embodiments, UAV 201 can send an acknowledgement signal for informing the operational subsystem 300 that the UAV 201 is on its way to the region of interest. Likewise, the UAV can send periodic location and/or operational status updates to the operational subsystem so that the operational subsystem 300 can extrapolate an estimated time of arrival at the region of interest. Likewise, if the UAV 201 unable to comply with the deployment request, it can send the appropriate incapacity or debilitation message to the operational subsystem 300, whereupon the operational subsystem 300 can find an alternative manner of complying with the sightseeing request. The UAV likewise may be damaged or otherwise incapacitated and unable to send any message back to the operational subsystem 300. In one embodiment, the operational subsystem can wait for a predetermined time interval for feedback from the UAV 201 and, if no feedback is received within the predetermined time interval, determine that the UAV 201 is unable to comply with the deployment request and take appropriate alternative action—e.g., deploying a different UAV 201 or informing the user that no UAV is available.

At 906, UAV 201 has arrived at the region of interest and is ready to begin acquiring data regarding the region of interest. As described above, the UAV 201 can be equipped to acquire a variety of data, including, but not limited to, both visual and non-visual data. Such data include, but are not limited to, images, videos, sound, temperature, pressure, humidity, precipitation, wind speed and direction, and/or other environmental factors. Various instruments suitable for acquiring such data are further described above with reference to FIG. 1.

The method 900 can grant the user varying degrees of autonomy in maneuvering the UAV 201 at the region of interest and deciding which data to capture. In one embodiment, the UAV 201 is subject to complete control by the user (subject to certain safeguards described above with reference to FIG. 6), such that the user can freely move the UAV 201 anywhere, move the camera at will, adjust exposure settings at will, or indeed do nothing if that is desired. However, recognizing that not all virtual sightseeing users will be comfortable with the full range of controls of the UAV, the user's control can be limited to a guided virtual sightseeing experience. In one embodiment, the UAV's flight trajectory is fixed, and the UAV is pre-programmed to move between certain geographic locations according to general interest. For example, the UAV 201 can follow a flight plan to visit each room of a museum in a predetermined sequence in case the user is indecisive or otherwise needs help with proceeding with the virtual tour. This flight plan can serve as a default that over control of the UAV after a certain amount of time without any control input from a user, and can be subsequently aborted if the user desires to take over. Alternatively, a user can be presented with a choice of whether to use the flight plan or not. In one embodiment, the user can still retain full control over the camera view and settings even if he or she does not control the flight path of the UAV 201. In yet another embodiment, both the flight trajectory and the camera view are pre-programmed so that the user can simply sit back and enjoy a fully guided virtual tour. Other intermediate levels of user autonomy can be used. For example, the user can have a limited degree of control over the UAV's flight, but the flight may be subject to range, position, altitude, velocity, and/or other constraints.

During the sightseeing process, other functions of UAV 201 can also be controlled by the user as desired. Functions that are subject to control include, for example, microphone sensitivity, as well as settings related to other instruments equipped on the UAV 201.

At 907, data acquired by UAV 201 (including both visual and non-visual data where applicable) is transmitted to terminal subsystem 400. In one embodiment, the acquired data is transmitted directly from the acquiring UAV to the terminal subsystem 400, e.g., directly to a specific terminal where a user is present. Direct data transmission to the terminal has an advantage that delay between sending and receiving of the data can be minimized to facilitate real-time data presentation. In another embodiment, the acquired data can be transmitted indirectly to the terminal subsystem 400 via the operational system 300. Such indirect data transmission, though it may result in higher latency, may be advantageous under certain circumstances, such as when some degree of data integration is sought. For example, where multiple UAVs 201 are in operation at the same time over the same region of interest, the acquired data feeds from all of these UAVs 201 can be combined into an integrated data stream for re-transmitting the transformed data to the terminal, which may not be equipped or have sufficient computational resources to perform such transformations on its own. In another example, the operational subsystem 300 can filter the UAV data feed and/or buffer the UAV data feed.

As described above, the mode of such transmission depends on the configuration of the operational subsystem 300 relative to the terminal subsystem 400. In some embodiments, the request is transmitted over a wireless communication network, e.g. a 3G or 4G network, as described herein. In some embodiments, the request is transmitted via TCP/IP, i.e., in accordance with the TCP/IP protocol. In other embodiments, the request is transmitted using a proprietary protocol, e.g. one specifically designed for a virtual sightseeing system.

At 908, acquired data regarding the region of interest arrives at the terminal subsystem 400, and more particularly at a terminal, where the acquired data can be presented. In particular, both visual and non-visual data may be presented. The acquired data can be presented in any suitable manner using the various embodiments of the terminal subsystem described above with reference to FIGS. 6A-C. The acquired data can be presented only visually as images and text, or it can be presented both visually and non-visually. In one embodiment, the data is presented in a virtual reality terminal. Virtual reality terminals such as a "virtual reality room" or "space suit" can be used for simulation of the environment of UAV 201, as further described above with reference to FIGS. 6B and 6C.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for operating unmanned aerial vehicle (UAV), comprising:

assigning a plurality of UAVs to station in a plurality of ground stations within a plurality of cells of a honeycomb UAV ground configuration covering an operational region, wherein a said cell in the honeycomb UAV ground configuration includes multiple said ground stations positioned in a miniature honeycomb pattern, each of the plurality of UAVs being assigned to station in at least one of the plurality of ground stations, and more UAVs being stationed in a first cell of high demand than in a second cell of low demand;

in response to an operating request and according to navigational information, redeploying at least one said UAV from the first cell to a region of interest within the second cell, and the operating request including operating settings, a location of the region of interest and a characteristic of the region of interest; and acquiring data regarding the region of interest via the redeployed UAV.

2. The method of claim 1, wherein said redeploying includes:
receiving the operating request;
computing a UAV deployment request based on the navigational information and the operating request;
transmitting the UAV deployment request to the at least one said UAV; and
deploying the at least one said UAV to the region of interest in response to the UAV deployment request.

3. The method of claim 2, wherein said computing the UAV deployment request comprises:
selecting an idle UAV from the UAVs,
selecting a UAV nearest to the region of interest from the UAVs,
selecting a UAV from a predetermined group of the UAVs,
selecting one or more UAVs from the UAVs for deployment to the region of interest,
dynamically selecting one or more UAVs from the UAVs for deployment to the region of interest, or
a combination thereof.

4. The method of claim 2, wherein said transmitting the UAV deployment request comprises transmitting the UAV deployment request using a 3G wireless network, a 4G wireless network, a TCP/IP protocol, or a combination thereof.

5. The method of claim 1, further comprising:
transmitting the acquired data regarding the region of interest to a terminal; and
presenting the acquired data using the terminal.

6. The method of claim 5, wherein said transmitting the acquired data comprises transmitting the acquired data using a 3G wireless network, a 4G wireless network, a TCP/IP protocol, or a combination thereof.

7. The method of claim 5, wherein said presenting the acquired data comprises presenting the acquired data in a virtual reality terminal, presenting the acquired data visually, presenting the acquired data non-visually, presenting the acquired data in real-time, or a combination thereof.

8. The method of claim 1, wherein the at least one said UAV is equipped with a subscriber identity module (SIM) card for identifying the at least one said UAV over a wireless communication network.

9. The method of claim 1, further comprising dynamically deploying one or more replacement UAVs to the region of interest in response to an incapacity of the at least one said UAV.

10. The method of claim 1, further comprising reconfiguring the UAV ground configuration in response to one or more seasonal sightseeing needs within the operational region.

11. The method of claim 1, wherein said redeploying comprises selecting a predetermined UAV from the plurality of UAVs based on a power status of the predetermined UAV.

12. The method of claim 1, wherein said redeploying comprises selecting a predetermined UAV from the plurality of UAVs based on a maintenance status of the predetermined UAV.

13. The method of claim 1, wherein said redeploying comprises selecting a predetermined UAV from the plurality of UAVs based on an equipment status of the predetermined UAV.

14. The method of claim 1, wherein more than one of the ground stations are positioned within a single cell of the honeycomb ground station configuration.

15. The method of claim 1, further comprising:
transmitting the acquired data regarding the region of interest to a plurality of terminals; and
controlling the one of the UAVs by a single one of the plurality of terminals without input from other ones of the plurality of terminals.

16. The method of claim 1, wherein redeploying the at least one UAV to the region of interest includes redeploying at least one of the UAVs that is equipped with night vision to the region of interest according to the characteristic of the region of interest.

17. The method of claim 1, wherein the operating settings further include at least one of flight settings, camera settings, settings of a total duration for the data acquisition, or settings of a number of UAV's to deploy.

18. The method of claim 1, wherein the first cell is adjacent to the second cell in the honeycomb UAV ground configuration.

19. The method of claim 1, wherein the redeployed UAV is selected from a plurality of idle UAVs that are assigned to station in one or more cells adjacent to the second cell in the honeycomb UAV ground configuration.

20. The method of claim 1, wherein different ones of the plurality of ground stations are equipped with different numbers of support systems depending on their distances to sightseeing hot spots.

21. The method of claim 20, wherein one of the plurality of ground stations that is located closer to one said sightseeing hot spot is equipped with more recharging stations for recharging the UAVs than another one of the plurality of ground stations that is farther away from the one said sightseeing hot spot.

22. A method for operating unmanned aerial vehicle (UAV) comprising:
assigning a plurality of UAVs to station in a plurality of ground stations within a plurality of cells of a honeycomb UAV ground configuration covering an operational region, wherein a said cell in the honeycomb UAV ground configuration includes multiple said ground stations positioned in a miniature honeycomb pattern, each of the plurality of UAVs being assigned to station in at least one of the plurality of ground stations, and more UAVs being stationed in a first cell of high demand than in a second cell of low demand;
receiving an operating request including operating settings, a location of a region of interest within the second cell, and a characteristic of the region of interest;

computing a UAV deployment request based on navigational information, the operating request, and a status of the UAVs;

transmitting the UAV deployment request to at least one said UAV assigned to station within the first cell;

redeploying the at least one said UAV from the first cell to the region of interest within the second cell in response to the UAV deployment request;

acquiring data regarding the region of interest via the redeployed UAV;

transmitting the acquired data regarding the region of interest to a terminal; and presenting the acquired data using the terminal.

23. The method of claim 22, wherein the plurality of ground stations are arranged according to a honeycomb ground station configuration.

24. A method for operating unmanned aerial vehicle (UAV) comprising:

assigning a plurality of UAVs to station in a plurality of ground stations within a plurality of cells of a honeycomb UAV ground configuration covering an operational region, wherein a said cell in the honeycomb UAV ground configuration includes multiple said ground stations positioned in a miniature honeycomb pattern, each of the plurality of UAVs being assigned to station in at least one of the plurality of ground stations, and more UAVs being stationed in a first cell of high demand than in a second cell of low demand;

selecting, in response to an operating request and according to navigational information, at least one said UAV for redeploying from the first cell to a region of interest within the second cell, and the operating request including operating settings, a location of the region of interest and a characteristic of the region of interest;

redeploying the at least one said UAV to the region of interest;

acquiring encrypted data regarding the region of interest via the redeployed UAV;

transmitting the acquired data regarding the region of interest to a terminal; and presenting the acquired data using the terminal.

25. A system for operating unmanned aerial vehicle (UAV), comprising:

a plurality of UAVs assigned to station in a plurality of ground stations within a plurality of cells of a honeycomb UAV ground configuration covering an operational region, wherein a said cell in the honeycomb UAV ground configuration includes multiple said ground stations positioned in a miniature honeycomb pattern, each of the plurality of UAVs being assigned to station in at least one of the plurality of ground stations, and more UAVs being stationed in a first cell of high demand than in a second cell of low demand; and an operational subsystem for:

redeploying, in response to an operating request and according to navigational information, at least one said UAV from the first cell to a region of interest within the second cell, and the operating request including operating settings, a location of the region of interest and a characteristic of the region of interest, the at least one said UAV being for acquiring data regarding the region of interest, wherein said operational subsystem is in communication with a terminal subsystem for inputting the operating request and presenting the acquired data regarding the region of interest.

26. The system of claim 25, wherein the at least one said UAV is equipped with an instrument for collecting image, video, sound, temperature, pressure, humidity, precipitation, wind speed, wind direction data, or a combination thereof regarding the region of interest.

27. The system of claim 25, wherein the terminal subsystem includes a virtual reality terminal for presenting visual and non-visual data acquired from the region of interest.

28. The system of claim 27, wherein said virtual reality terminal comprises:

a speaker for presenting sound data, a heating/cooling element for presenting temperature data, a humidifier/dehumidifier for presenting humidity data, a sprinkler system for presenting precipitation data, a ventilation system for presenting pressure, wind speed, wind direction data, or a combination thereof acquired from the region of interest, or a combination thereof.

* * * * *